United States Patent

Haka

[11] Patent Number: 5,393,273
[45] Date of Patent: Feb. 28, 1995

[54] POWERTRAIN AND CONTROL HAVING A PLURALITY OF ACCUMULATORS

[75] Inventor: Raymond J. Haka, Rochester, Mich.

[73] Assignee: General Motors Corporation, Detroit, Mich.

[21] Appl. No.: 80,268

[22] Filed: Jun. 21, 1993

[51] Int. Cl.[6] ............................................. F16H 61/06
[52] U.S. Cl. ..................................... 475/129; 74/335; 477/150
[58] Field of Search .......................... 475/129; 74/335; 477/150

[56] References Cited

U.S. PATENT DOCUMENTS

| | | | |
|---|---|---|---|
| 5,109,733 | 5/1992 | Ishikawa et al. | 475/129 |
| 5,176,046 | 1/1993 | Fujiwara et al. | 475/129 |
| 5,205,192 | 4/1993 | Ohashi et al. | 477/150 |

Primary Examiner—Edward K. Look
Assistant Examiner—Christopher Verdier
Attorney, Agent, or Firm—Donald F. Scherer

[57] ABSTRACT

A multi-speed transmission has a hydraulic control system for establishing a plurality of forward drive ratios and a reverse drive ratio. Each drive ratio is established by the engagement of a fluid operated friction device, such as a clutch or brake. The engagement timing of each friction device is controlled in part by an accumulator. Each accumulator is disposed to accommodate friction devices, such that five forward speed and one reverse speeds require only a maximum of three accumulators.

4 Claims, 2 Drawing Sheets

POWERTRAIN AND CONTROL HAVING A PLURALITY OF ACCUMULATORS

TECHNICAL FIELD

This invention relates to transmissions and controls. More particularly, this invention relates to transmissions having fluid operated friction devices and controls including accumulators for establishing the engagement time of each friction device.

BACKGROUND OF THE INVENTION

Automatic shifting power transmissions, both planetary and countershaft type, have hydraulic controls systems for effecting the establishment and disestablishment of power paths through the gearing in the transmission. The power paths include fluid operated friction devices, such as clutches and brakes, for connecting the appropriate gear components to the power source; i.e., the prime mover, or to ground; i.e., transmission housing.

When a ratio interchange is being made, at least one friction device is being engaged to establish the power path. Hydraulic timing devices are used to control the engagement rate of the on-coming friction device. The timing devices include accumulators which are filled with hydraulic fluid simultaneously with a fluid motor of the friction device. These accumulators require space within the transmission and the installation of pistons, springs and covers at assembly.

There are accumulators in the form of self-contained assemblies that can reduce the assembly time and cost. These devices do not reduce the number of accumulators nor the space required. As a general rule, each friction device has an accumulator, such that six friction devices require six accumulators.

SUMMARY OF THE INVENTION

In order to improve the space utilization in power transmissions, the present invention uses each accumulator at least twice. The accumulators are used to provide timing control during friction device engagement. The reuse of the accumulator is separated by at least one ratio step or ratio interchange, and the same accumulator is not used for both forward and reverse drive initiation. For example, one accumulator is filled during the initiation of forward drive and again during a 4–5 ratio interchange. Another accumulator is filled during the initiation of reverse drive and again during a 2–3 ratio interchange. Yet another accumulator is filled during both a 1–2 ratio interchange and a 3–4 ratio interchange. Other combinations are possible, as long as there is time to depressurize the accumulator between fillings. It is also possible to reuse the accumulator more than twice if the above requirement is fulfilled.

It is therefore an object of this invention to provide an improved transmission and control having a plurality of accumulators, wherein two or more accumulators are each incorporated in an on-coming friction device engagement timing circuit during at least two ratio interchanges.

It is another object of this invention to provide an improved transmission and control having a plurality of accumulators, wherein one accumulator is employed during reverse drive initiation and one forward ratio interchange, and another accumulator is employed during forward drive initiation and yet another forward ratio interchange.

These and other objects and advantages of the present invention will be more apparent from the following specification and drawings.

DESCRIPTION OF THE PREFERRED EMBODIMENT

Figure 1:
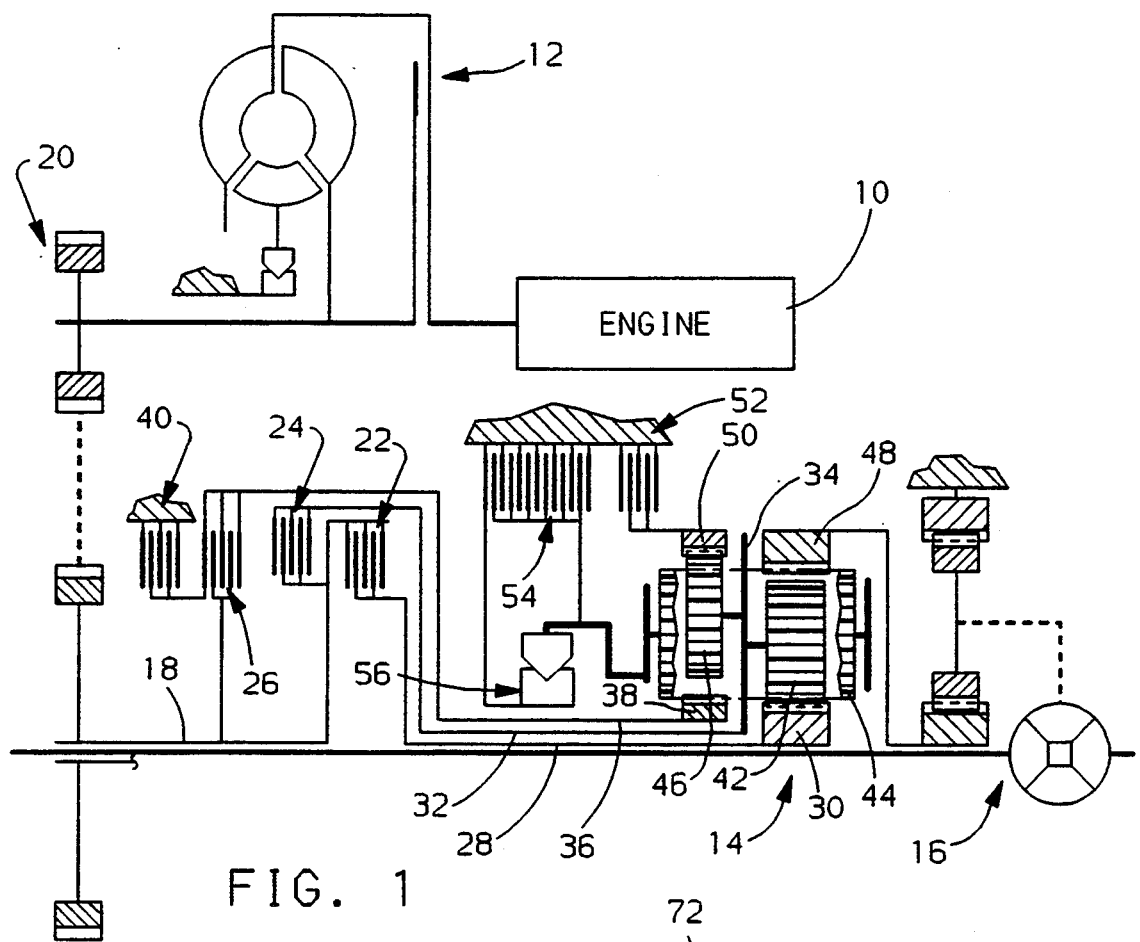
FIG. 1 is a diagrammatic representation of a powertrain showing a transmission which may incorporate a control using the present invention.

Referring to the drawings, wherein like characters represent the same or corresponding parts throughout the several views, there is seen in FIG. 1 a powertrain having an engine 10, a torque converter 12, a planetary gearing arrangement 14 and a final drive and differential output mechanism 16.

The torque converter 12 is a conventional fluid operated hydrodynamic drive mechanism which is coupled between the engine 10 and an input shaft 18 for the gear arrangement 14 through a sprocket and chain drive 20. These types of transmission inputs are well known such that there is no need for more involved description at this point.

The input shaft 18 is operatively connected with three clutch assemblies 22, 24 and 26. The clutch assembly 22 is drivingly connected with a shaft 28 which in turn is operatively connected with a sun gear 30 of the planetary gear arrangement 14. The clutch 24 is drivingly connected with a shaft 32 which is operatively connected to a planet carrier 34 of the planetary gear arrangement 14. The clutch 26 is drivingly connected to a shaft 36 which is operatively connected with a sun gear 38 of the planetary gear arrangement 14.

The sun gear 38 is also operatively connected with a fluid operated friction brake 40 which will permit the sun gear 38 to be held stationary. The carrier 34 rotatably supports a plurality of pinion gears 42, 44 and 46. The planet pinion 42 is meshingly engaged with the sun gear 30, the planet pinion 44 is meshingly engaged with the planet pinions 42 and 46, sun gear 38 and a ring gear 48. The planet pinion 46 is meshingly engaged with the planet pinion 44 and a ring gear 50.

The ring gear 48 is drivingly connected with the output and differential assembly 16. The ring gear 50 is operatively connected with a brake 52 which will provide selective holding of the ring gear 50. The carrier 34 is operatively connected to a fluid operated friction brake 54 and a one-way device 56. Both the brake 54 and the one-way device 56 will permit selective connection of the carrier 34 with a transmission housing to provide selective braking of the carrier 34.

The planetary gear arrangement shown in FIG. 1 is capable of producing at least five forward speeds and one reverse speed. The clutch 22 is engaged for three of the forward speeds, including 1 through 3. The clutch 24 is engaged for three of the forward speeds, including 3 through 5. The clutch 26 is engaged for reverse drive operation, hence the reverse clutch.

Also engaged for reverse drive operation is the fluid operated brake 54, such that during reverse, the carrier is held stationary while the sun gear 38 is driven by the engine and the ring gear 48 is driven in the opposite direction through the planet pinion 44.

To establish the first forward ratio, the clutch 22, hence the forward clutch is engaged and the carrier 34 is held stationary by the one-way device 56. This will provide a reduction drive between the sun gear 30 and the ring gear 48. To establish the second ratio, the brake 40 is engaged which will hold the sun gear 38 stationary as a reaction member in the system, and again a reduction drive is provided between the sun gear 30 and the ring gear 48.

To establish the third forward ratio, clutch 24 is engaged creating a 1:1 drive ratio, hence the direct clutch through the planetary gear set. Also, during the interchange from second gear ratio to third gear ratio, the brake 40 is disengaged. To establish the fourth forward gear ratio, the clutch 22 is disengaged while the brake 40 is engaged, again establishing the sun gear 38 as a reaction member in the planetary gear arrangement 14. However, at this point, the carrier 34 is the input member for the planetary gear arrangement, such that an overdrive ratio between the carrier 34 and the ring gear 48 will occur.

To establish the fifth and highest forward speed ratio, the brake 52 is engaged by the brake 40 is disengaged. With the brake 52 engaged and the carrier 34 driven at engine speed, the ring gear 48 will be overdriven relative to the input shaft 18.

It is possible to provide a sixth forward speed by utilizing the combination of the clutch 22 and the brake 52. With this combination, an underdrive speed intermediate the first and second ratios can be attained. Should it be desirous to utilize the six speeds of this transmission, the control system can be made to accommodate such an arrangement.

For a more complete description of the gearing arrangement shown in FIG. 1, the U.S. Pat. No. 5,046,999 issued to Lui et al. on Sep. 10, 1991, can be reviewed. This patent describes a number of gearing arrangements utilizing six friction devices to obtain the five forward speeds and one reverse speed.

Figure 2:
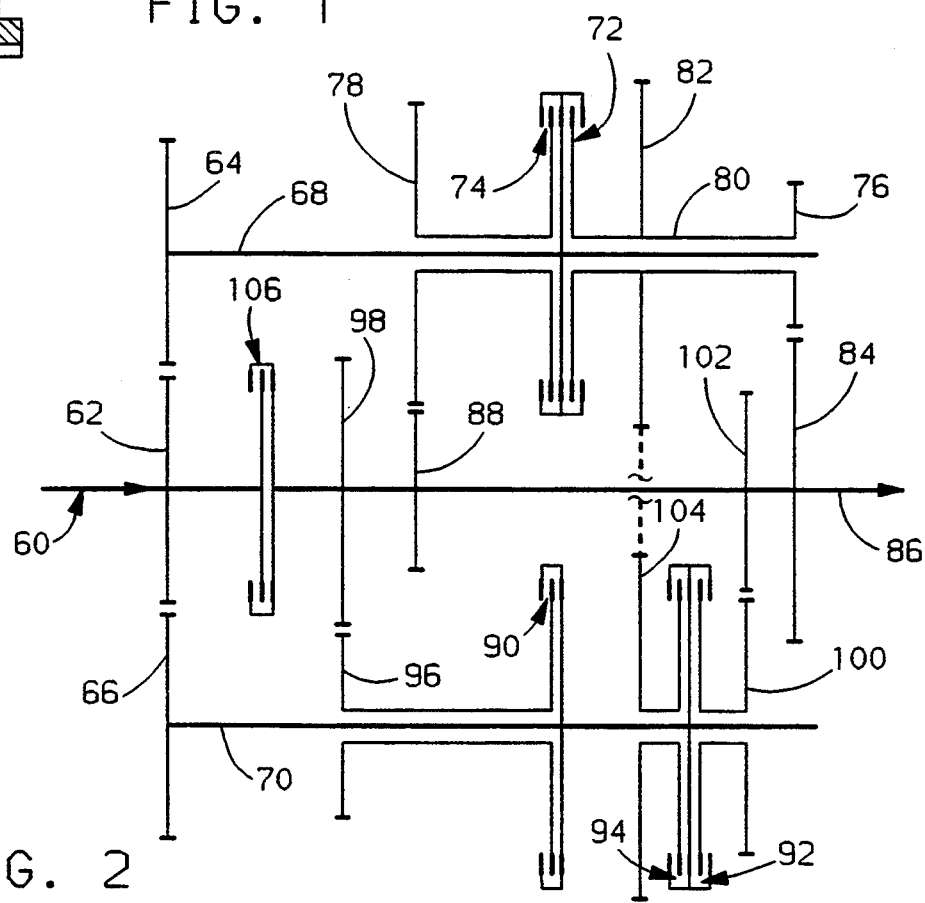
FIG. 2 is a schematic representation of a countershaft type transmission which may also utilize the present invention.

The gearing arrangement shown in FIG. 2 is similar to that shown in U.S. Pat. No. 5,009,116 issued to Ordo et al. on Apr. 23, 1991. The primary difference between the gearing arrangement shown in FIG. 2 and the Ordo et al. patent is the use of individual friction clutches for the fourth and reverse speeds. With the Ordo patent, the fourth and reverse speeds are provided with a forward/reverse synchronizer which selects the gear members to be connected to a shaft member and a single clutch to connect the synchronizer input to the drive train.

With the present invention, it is believed to be more prudent to use fluid operated friction clutches for all of the drive ratios rather than to use a fluid operated synchronizer. However, the present invention will work equally well with a fluid operated synchronizer as will be apparent in the description of FIG. 3.

The transmission shown in FIG. 2, includes an input shaft 60 which is drivingly connected to an input gear 62. Input gear 62 in turn meshes with a pair of countershaft gears 64 and 66 which are drivingly connected with respective countershafts 68 and 70. The countershaft 68 is operatively connected to a pair of fluid operated clutches 72 and 74 which in turn are operatively connected to gear members 76 and 78, respectively.

A sleeve shaft 80 connected between clutch 72 and gear 76 is also drivingly connected with a gear 82. The gear 76 is meshingly engaged with a gear 84 which is drivingly connected with a transmission output shaft 86. The gear 78 is meshingly engaged with a gear 88 which is drivingly connected with the output shaft 86.

The countershaft 70 has operatively connected therewith three fluid operated friction clutches 90, 92 and 94. Clutch 90 is drivingly connected with a gear 96 which in turn meshes with a gear 98 drivingly connected with the output shaft 86. The clutch 92 is drivingly connected with a gear 100 which is meshingly engaged with a gear 102 which is drivingly connected with the output shaft 86. The clutch 94 is drivingly connected with a gear 104 which meshes with the gear 82.

The input shaft 60 has operatively connected therewith a fluid operated friction clutch 106 which is selectively engageable to connect the input shaft 60 directly with the output shaft 86. The judicious selection or engagement of the fluid operated friction clutches will provide five forward speeds and one reverse speed between the input shaft 60 and the output shaft 86.

The clutch 72 is engaged to provide the lowest forward ratio and utilizes the gears 62, 64, 76 and 84, to provide this ratio reduction. The next or second forward ratio is established through the engagement of fluid operated clutch 90 and utilizes a power train defined by gears 62, 66, 96 and 98. The third forward ratio is established with the engagement of fluid operated clutch 74 to provide a power path defined by gears 62, 64, 78 and 88. The fourth forward drive ratio is established by the selective engagement of the fluid operated clutch 92 to provide a power path defined by gears 62, 66, 100 and 102. The fifth forward drive ratio is provided by the engagement of clutch 106, such that a direct drive between shaft 60 and shaft 86 is provided. A reverse drive is established by the engagement of clutch 94 to provide a power path defined by the gears 62, 66, 104, 82, 76 and 84.

This transmission provides the gear ratios similar to those defined in the Ordo et al. patent. By the judicious selection of the sizes of the various gear members, the ratio spread can, of course, be controlled and, if desired, one or more of the forward ratios can be manufactured as overdrive ratios, such that the engagement of clutch 106 providing a direct drive would then not be the highest forward drive ratio in the system. These modifications are will be quite apparent to those skilled in the art of transmission gearing design.

Figure 3:
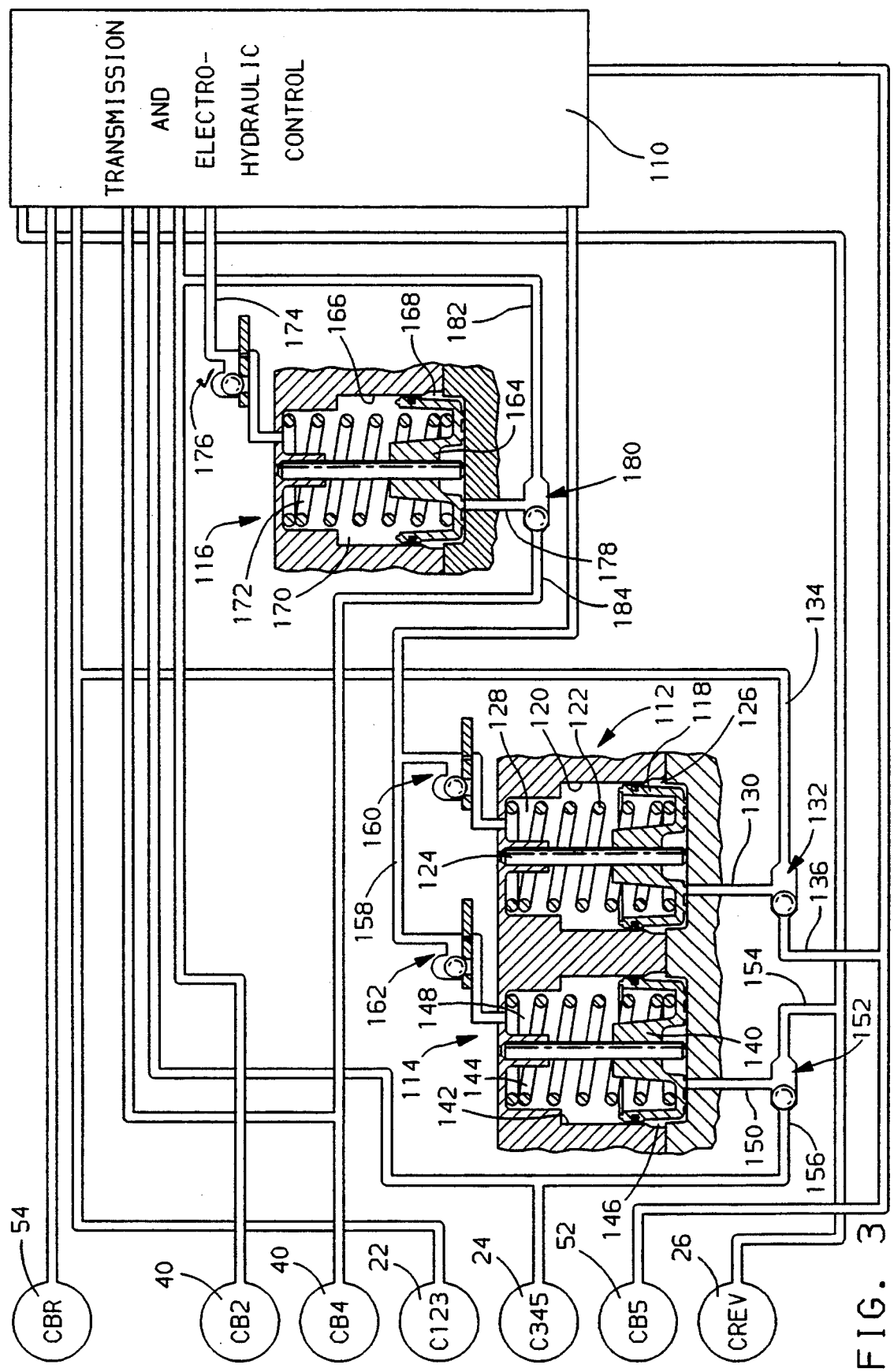
FIG. 3 is a diagrammatic representation of a transmission control system utilizing the present invention.

To establish the controlled engagement of the various clutches and brakes of the transmissions shown in FIGS. 1 and 2, a hydraulic system, such as that shown in FIG. 3, is utilized.

The hydraulic system disclosed in FIG. 3 has a transmission and electro-hydraulic control apparatus 110 which incorporates the gearing arrangement and the various clutches and/or brakes needed to control the gearing arrangement. The transmission and electro-hydraulic control 110 also includes the necessary valving to control the ratio interchange between forward and reverse drive initiation and between the various forward ratios. These devices are quite well known and in general include solenoid controlled valve members which may be conventional on/off solenoids or modulated solenoids of one type or another.

To provide a more clear definition, the fluid operated friction devices are shown separated from the transmission and control 110 and represented by the various circular elements on the left side of the figure. These elements are labeled to suggest their function and are utilized with a transmission similar to that shown in FIG. 1. For example, the clutch engaged for reverse drive operation is CREV while the brake engaged for the fifth forward drive ratio is CB5. Therefore, the various friction elements will be given the same numeric designation as utilized in FIG. 1.

It should be noted that the same brake 40 is used for both second and fourth ratios. This can be accomplished by either utilizing the same actuating piston or using separate actuating pistons within the device. If the same actuating piston is utilized, the fluid directed from the control 110 to the friction device operating piston can be distributed through a shuttle valve to provide the engagement function. Such control systems are well known.

The control system shown in FIG. 3 further includes three accumulator assemblies 112, 114 and 116. The accumulator 112 includes a piston 118 slidably disposed in a valve bore 120 and urged toward one end thereof by a compression spring 122. The piston 118 is slidably disposed on a rod 124 to assist in stabilizing the piston 118 during operation.

An accumulator chamber 126 is formed between one end of the bore 120 and the piston 118 and a trim chamber 128 is formed between the other side of the piston 118 and the other end of bore 120. As is well known, the trim chamber is utilized to assist in controlling the pressure which must be overcome by the accumulator piston prior to beginning the stroking of the piston 118.

The chamber 126 is disposed in fluid communication with a feed passage 130 which in turn is fed through a shuttle valve 132 by a pair of passages 134 and 136. The passage 134 is disposed in fluid communication with the clutch 22 and the passage 136 is disposed ill fluid communication with the brake 52.

The accumulator 114 is similar in design to the accumulator 112 and includes a piston 140 slidably disposed in a bore 142 and urged toward one end thereof by a spring 144. The accumulator 114 also has an accumulator chamber 146 formed by the piston 140 and bore 142 and a trim chamber 148 formed by the piston 140 and the bore 142.

The accumulator chamber 146 is disposed in fluid communication with a passage 150 which in turn is connected through a shuttle valve 152 to a pair of passages 154 and 156. The passage 154 is connected with the clutch 26 and the passage 156 is connected with the 3-4-5 clutch 24.

The trim chambers 128 and 148 are connected with a trim passage 158 which is supplied with trim pressure fluid from the transmission electronic control module 110. The trim passage is supplied to the trim chambers 128 and 148 through respective ball and orifice structures 160 and 162. The orifice provides for slow filling of the trim chambers while the ball dump permits rapid exhaust of the trim chambers.

The accumulator 116 is similar to the accumulators 112 and 114, and in that respect, includes a piston 164 slidably disposed in a bore 166 which cooperates with the piston to establish an accumulator chamber 168 and a trim chamber 170. The piston 164 is urged toward the accumulator chamber 168 by a spring 172. The trim chamber 170 is controlled in fluid pressure through a passage 174 which directs fluid from the transmission electronic control module 110 to the trim chamber 170 through an orifice and ball dump assembly 176. This assembly works in a manner similar to that described above for assemblies 160 and 162.

The accumulator chamber 168 is connected with a feed passage 178 which in turn is connected through a shuttle valve 180 to a pair of passages 182 and 184. The passage 182 is disposed in fluid communication with the second ratio brake 40 and the passage 184 is disposed in fluid communication with the fourth ratio brake 40. As explained above, these brakes can be fed by the same passage from the transmission control, and therefore the shuttle valve 180 can be done away with.

The accumulators are used with a countershaft type transmission, such as that shown in FIG. 2, wherein the clutches are not reused for other ratios, The fourth ratio clutch 92 and the second ratio clutch 90 would replace the second and fourth ratio brakes 40 and therefore the shuttle valve 180 would be required.

When the accumulators 112, 114 and 116 are used with the planetary gear arrangement shown in FIG. 1, the accumulator 112 is utilized in both forward drive initiation and the 4-5 ratio interchange. The accumulator 114 is utilized for reverse drive initiation and for the 2-3 ratio interchange. The accumulator 116 is utilized for the 1-2 ratio interchange and the 3-4 ratio interchange.

It will be noted that the shared ratios have at least one ratio step between their use. This provides the time needed to depressurize the accumulator chambers through the control 110. It should also be noted that the forward drive initiation with the engagement of clutch 22 requires that the accumulator 112 remain filled through the first three gear ratios. Until the 3-4 ratio interchange is made, the accumulator 112 cannot be reused.

However, when this accumulator control is utilized with other gearing arrangements which do not require the continued engagement of one friction device for two or more ratios, a more flexible arrangement can be made. For example, when the accumulators are used with a countershaft type transmission, the reverse drive initiation accumulator can be utilized with all of the odd/even drive ratio interchanges. That is, the accumulator 114 could be used with reverse, the 1-2 interchange and the 3-4 interchange. The accumulator 112 could be used with the forward drive initiation, the 2-3 interchange and the 4-5 interchange.

To utilize more than two ratios with any one accumulator, it is necessary to increase the shuttle valve logic. That is, if the accumulator is used with a drive initiation and two ratio interchanges, at least two shuttle valves would be required—one shuttle valve to provide forward selection and the ratio interchange selection and the second shuttle valve will determine which of the ratio interchanges is being utilized to feed the accumulator.

Again, what should be appreciated is that the accumulators can be reused after they have had time to be depressurized during a disengaged condition for their respectively controlled friction devices.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A transmission and control comprising:

forward fluid operated friction drive establishing means;

reverse fluid operated friction drive establishing means;

fluid operated friction drive ratio establishing means for selectively establishing a plurality of forward drive ratios;

a first accumulator and valve means for independently selectively controlling a pressure rise in the forward fluid operated friction drive establishing means to establish a first forward drive ratio and in one of the fluid operated friction drive ratio establishing means to establish one of the forward drive ratios;

a second accumulator and valve means for independently selectively controlling a pressure rise in the reverse fluid operated friction drive establishing means and another of said fluid operated friction drive establishing means to establish another of the forward drive ratios; and a third accumulator and valve means for independently selectively controlling a pressure rise in one of the fluid operated friction drive ratio establishing means to establish yet another of the forward drive ratios and in one of the fluid operated friction drive ratio establishing means to establish a further of the forward drive ratios.

2. The transmission and control defined in claim 1, wherein the one of the forward drive ratios is disposed at least one shift interchange from the first forward drive ratio.

3. The transmission and control defined in claim 2, wherein the yet another forward drive ratio is established by the ratio interchange immediately upward from the first drive ratio, and the further of the forward drive ratios is established by the ratio interchange immediately upward from the other of the forward drive ratios.

4. A transmission and control comprising:

a plurality of fluid operated friction torque transmitting means for establishing a plurality of drive ratios in a transmission including a plurality of forward ratios and a reverse ratio; and control means for controlling the engagement and disengagement of the torque transmitting means and for controlling ratio interchanges in the transmission including a first accumulator means for controlling the engagement timing of the friction torque transmitting means for establishing a lowest ratio in a forward range and one of the friction torque transmitting means engaged during one ratio interchange at least one step from the establishment of the lowest ratio in the forward range, and a second accumulator means for controlling the friction torque transmitting means for establishing the reverse ratio and for controlling one of the friction torque transmitting means engaged during another forward ratio interchange.

* * * * *